(12) United States Patent
Shen (10) Patent No.: US 9,118,208 B2
(45) Date of Patent: Aug. 25, 2015

(54) CHARGER OF MOBILE TERMINAL AND MOBILE TERMINAL

(75) Inventor: Shaowu Shen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 506 days.

(21) Appl. No.: 13/521,073

(22) PCT Filed: Aug. 6, 2010

(86) PCT No.: PCT/CN2010/075765
§ 371 (c)(1),
(2), (4) Date: Jul. 9, 2012

(87) PCT Pub. No.: WO2011/140746
PCT Pub. Date: Nov. 17, 2011

(65) Prior Publication Data
US 2013/0063076 A1 Mar. 14, 2013

(30) Foreign Application Priority Data
May 12, 2010 (CN) .......................... 2010 1 0175854

(51) Int. Cl.
*H02J 7/32* (2006.01)

(52) U.S. Cl.
CPC ... *H02J 7/32* (2013.01); *Y02B 40/90* (2013.01)

(58) Field of Classification Search
USPC .......... 320/107, 114, 101, 138, 139; 307/125; 340/10.1, 5.64, 10.34; 290/1; 455/343, 455/566
See application file for complete search history.

(56) References Cited

U.S. PATENT DOCUMENTS

| 6,346,791 B1 * | 2/2002 | Barguirdjian ................. 320/101 |
| 7,638,889 B2 * | 12/2009 | Yeh ............................... 290/1 A |
| 8,228,031 B2 * | 7/2012 | Alameh et al. ................ 320/115 |
| 2007/0029883 A1 * | 2/2007 | Yoshida ........................ 307/125 |

(Continued)

FOREIGN PATENT DOCUMENTS

| CN | 2355489 Y | 12/1999 |
| CN | 1267929 A | 9/2000 |

(Continued)

OTHER PUBLICATIONS

International Search Report for PCT/CN2010/075765, English translation attached to Original, Both completed by the Chinese Patent Office on Jan. 19, 2011, All together 6 Pages.

(Continued)

*Primary Examiner* — Richard Isla Rodas
*Assistant Examiner* — Moustafa Khalil
(74) *Attorney, Agent, or Firm* — Brooks Kushman P.C.

(57) ABSTRACT

A charging device for a mobile terminal and a mobile terminal are disclosed. The charging device includes a motor for power generation, a drive module, a charge pump module, a filtering and voltage regulation module and a control unit. The drive module is connected with an input end of the motor and is configured to obtain swing kinetic energy of the mobile terminal. The charge pump module is connected with an output end of the motor and is configured to boost a voltage output by the motor. The filtering and voltage regulation module is configured to perform direct current filtering and voltage regulation processing on a voltage output by the charge pump module, so as to output a charging voltage matching with a battery. The control unit is configured to accumulate charging current so as to adapt to the battery, and to control a charging process.

16 Claims, 3 Drawing Sheets

(56) References Cited

U.S. PATENT DOCUMENTS

| | | | |
|---|---|---|---|
| 2007/0040655 A1* | 2/2007 | Lee et al. | 340/10.1 |
| 2007/0046251 A1* | 3/2007 | Chi-Hsueh | 320/101 |
| 2008/0074079 A1* | 3/2008 | Wong et al. | 320/114 |
| 2008/0309180 A1* | 12/2008 | Suzuki et al. | 310/81 |
| 2009/0200983 A1 | 8/2009 | Dyer et al. | |
| 2010/0097032 A1* | 4/2010 | Chou | 320/114 |

FOREIGN PATENT DOCUMENTS

| | | |
|---|---|---|
| CN | 2594839 Y | 12/2003 |
| CN | 200953367 Y | 9/2007 |
| CN | 201181850 Y | 1/2009 |
| EP | 0786849 | 7/1997 |
| GB | 2389719 | 12/2003 |
| KR | 20050015246 A | 2/2005 |
| WO | 9842060 | 9/1998 |
| WO | 2005004303 | 1/2005 |
| WO | 2008062377 | 5/2008 |

OTHER PUBLICATIONS

Extended European Search Report for EP 10851251.8 Dated Oct. 15, 2013, 6 Pages.

* cited by examiner

CHARGER OF MOBILE TERMINAL AND MOBILE TERMINAL

CROSS-REFERENCE TO RELATED APPLICATION

This application is the U.S. national phase of PCT Appln. No. PCT/CN2010/075765 filed Aug. 6, 2010 which claims priority to Chinese Application No. 201010175854.5 filed May 12, 2010, the disclosures of which are incorporated in their entirety by reference herein.

TECHNICAL FIELD

The present invention relates to the mobile terminal technology field, and particularly, to a charging device for a mobile terminal and a mobile terminal equipped with the charging device for the mobile terminal.

BACKGROUND OF THE RELATED ART

It is well known that, a mobile terminal (such as a mobile phone, a personal digital assistant (PDA), and so on) generates power consumption during the use, and the battery must be charged if the mobile terminal needs to continue to be used immediately after the power is run out. At present, the mode of charging the mobile terminal is mainly to convert an external power supply into electric energy adapted to the mobile terminal through a charger, so as to charge the mobile terminal. Since there is no suitable external power supply outdoors or in a long journey, the charge is very troublesome. Based on that, people design some mobile charging device, such as, a spring charging device, a solar charging device, and so on. However, all of them have some defects; for example, the spring charging device needs to be wound up manually, and the battery of the mobile terminal still cannot be charged in the case of being not able to perform the manual operation, such as riding or climbing; while the solar charging device has a requirement for the charging environment, the charging efficiency is lower in insufficient light, and especially when the surrounding environment is dark, the battery of the mobile terminal cannot be charged. Thus it is necessary to provide a charging device for a mobile terminal, so as to reduce the impact of external factors on the charging, and to improve the convenience for charging the mobile terminal.

SUMMARY OF THE INVENTION

The main purpose of the present invention is to provide a charging device for a mobile terminal and a mobile terminal, so as to improve the convenience for charging the mobile terminal.

The present invention provides a charging device for a mobile terminal, and the charging device comprises a motor for power generation, a drive module, a charge pump module, a filtering and voltage regulation module and a control unit; wherein, the drive module is connected with an input end of the motor and is configured to obtain swing kinetic energy of the mobile terminal to drive the motor to work;

the charge pump module is connected with an output end of the motor and is configured to boost a voltage output by the motor;

the filtering and voltage regulation module, an input end of which is connected with the charge pump module, is configured to perform direct current filtering and voltage regulation processing on a voltage output by the charge pump module, so as to output a charging voltage matching with a battery;

the control unit is connected with the filtering and voltage regulation module and is configured to accumulate charging current so as to adapt to the battery, and to control a charging process.

The motor is a vibration motor in the mobile terminal, and the vibration motor is a three-phase motor; the charging device for the mobile terminal further comprises a motor conversion circuit, which has at least two parallel capacitors and is configured to convert the vibration motor from an electric mode to a power generation mode.

The drive module comprises a gear set and a gravity hammer, and the gravity hammer is connected with the motor through the gear set, so as to adjust rotation speed of the motor to make the motor output electric energy.

Preferably, when the gravity hammer is a magnet, the drive module further comprises a vibration button, which is a common key of the mobile terminal and is directly above the gravity hammer; and a magnet whose magnetic pole is the same as that of the gravity hammer is set right below the button; so that, once the button is pressed, the gravity hammer swings freely to drive the gear to rotate.

The charge pump module is a switching regulator booster pump circuit, in which at least two sets of switches and capacitors are configured in parallel.

The filtering and voltage regulation module comprises a filtering module, a voltage regulation module and an overvoltage protection module; the filtering module is configured to obtain a direct current voltage, the voltage regulation module is configured to perform the voltage regulation processing to the direct current voltage obtained by the filtering module, so as to obtain a stable charging voltage, and the overvoltage protection module is multiplexed with an overvoltage protection chip of the mobile terminal.

The control unit comprises a power management chip and a charging control module; the power management chip is connected with an output end of the filtering and voltage regulation module and is configured to accumulate the charging current to adapt to the battery, and to detect a charging state or power of the battery so as to control the charging process; and the charging control module is configured to disconnect or conduct a charging circuit between the filtering and voltage regulation module and the rechargeable battery according to the control of the power management chip.

The aforementioned charging device for the mobile terminal further comprises a charging switching module and a charging display module connected with the power management chip; wherein, the charging display module is configured to display the charging state, and the charging switching module is configured to implement a switch between a manual charging and an external charging according to the charging state.

The aforementioned charging device for the mobile terminal further comprises an electromagnetic relay module which comprises a coil and an armature; wherein, the coil is connected with the power management chip, and the armature is configured to control the swing of the gravity hammer, and when the power management chip energizes the coil, to attract the gravity hammer, and when the power management chip does not energize the coil, to separate from the gravity hammer.

The present invention also provides a mobile terminal which comprises a rechargeable battery and the aforementioned charging device for the mobile terminal.

The charging device for the mobile terminal provided by the present invention, is set in the mobile terminal, and takes full advantage of the body kinetic energy to drive the motor to work through the aforementioned drive module, so that a battery in the mobile terminal can be charged by outputting the electric energy; thus the influence of external factors of human, environments and so on is reduced during the charging process, and the convenience for charging the mobile terminal is improved greatly.

PREFERRED EMBODIMENTS OF THE PRESENT INVENTION

In the present invention, the mobile terminal may be a mobile phone, a PDA, and so on, and the present invention will be illustrated in detail by taking the mobile phone for example hereinafter. It should be understood that, the described specific embodiments herein are only used to explain the present invention, rather than restrict the present invention.

Figure 1:
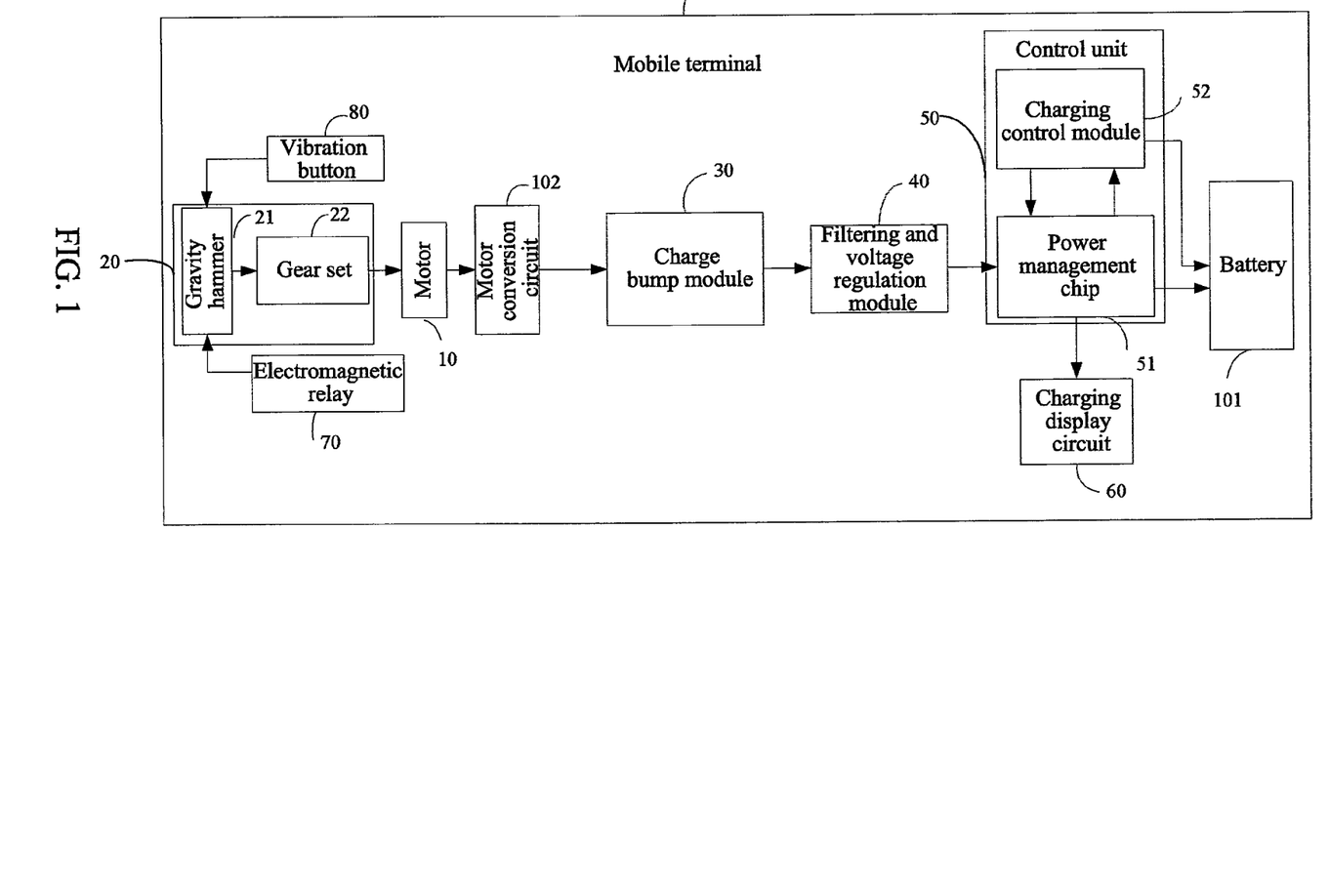
FIG. 1 is a structure diagram of a charging device for a mobile terminal of the present invention.

FIG. 1 shows a structure of a charging device for a mobile terminal in an embodiment of the present invention, the charging device for the mobile terminal is set in the mobile terminal 100 and is used to charge a battery 101 in the mobile terminal 100; the charging device for the mobile terminal is equipped with a motor 10 which can be used for power generation, and the charging device for the mobile terminal is further equipped with:

a drive module 20, which is connected with an input end of the motor 10, and is used to obtain swing kinetic energy of the mobile terminal 100 to drive the motor 10 to work;

a charge pump module 30, which is connected with an output end of the motor 10, and is used to boost a voltage output by the motor 10;

a filtering and voltage regulation module 40, whose input end is connected with the charge pump module 30, and which is used to perform direct current filtering and voltage regulation on a voltage output by the charge pump module 30, so as to output a charging voltage matching with the battery;

a control unit 50, which is connected with the filtering and voltage regulation module 40, and is used to accumulate charging current so as to adapt to the battery 101 and to control a charging process.

In an embodiment, the mobile terminal 100 can be a mobile phone, the battery 101 is a rechargeable battery in the mobile phone, and the motor 10 can be a micro power generation motor, or also can be an electric vibration motor in the mobile phone. In an example, a multiphase vibration motor whose rotor is made of permanent magnet can be selected, and the outlet side of the multiphase vibration motor is connected with a motor conversion circuit 102, thus the function of power generation is implemented by the conversion of the motor conversion circuit 102. The motor conversion circuit 102 can be connected with a plurality of capacitors in parallel, so as to convert the vibration motor from an electric mode to a power generation mode. In another example, if the vibration motor is a single-phase direct current motor, no parallel capacitor is needed according to the reversible principle of the motor, while an outgoing line end of that single-phase direct current motor connects with impedance, so that the current is output to implement the function of power generation. Of cause, the motor 10 also can be other Micro-Electro-Mechanical Systems (MEMS) set in the mobile phone.

The drive module 20 is used to obtain the swing kinetic energy of the mobile terminal to drive the motor 10 to work, so that the motor outputs the electric energy. Specifically, the drive module 20 can have a gravity hammer 21 and a gear set 22, wherein the gravity hammer 21 is connected with the motor 10 through the gear set 22, and the gear set 22 is driven to rotate by the movement of the gravity hammer 21, so that the rotor of the motor 10 moves jointly. The rotor of the motor 10 performs a movement of cutting magnetic induction lines in a magnetic field to generate an induced electromotive force, and then induced current is formed and generated, so as to charge the battery of the mobile phone. The gear set 22 is composed of two groups of gears having different sizes for engaging. The gravity hammer 21 drives the inner ring of the main gear to rotate, and the pinion implements a linkage by engaging with the main gear. The ratio of the gears can be adjusted according to the voltage value required to be generated, for example, 10,000 RPM (Rotation Per Minute) is required if a charging voltage of 5V is generated, while 1,000 RPM is only required if a voltage of 0.5V is generated; therefore, the ratio of the gears can be designed to be 1:8, and the motor can be made to implement 1,000 RPM to generate the continuous voltage in the case that the rotation speed of the main gear is 2 rotation per second.

In an embodiment, the gravity hammer 21 can be a mechanical pendulum or an automatic pendulum, which includes a plumb line and a hammer connected to one end of the plumb line, and the other end of the plumb line fixes to be connected with the main gear of the gear set 22. When the hammer deviates from the plumb line (that is an equilibrium position) any angle under force and then let it go, the hammer will pivot around to do a reciprocating motion under the action of gravity, so as to drive the gear set 22 to rotate.

Figure 2:
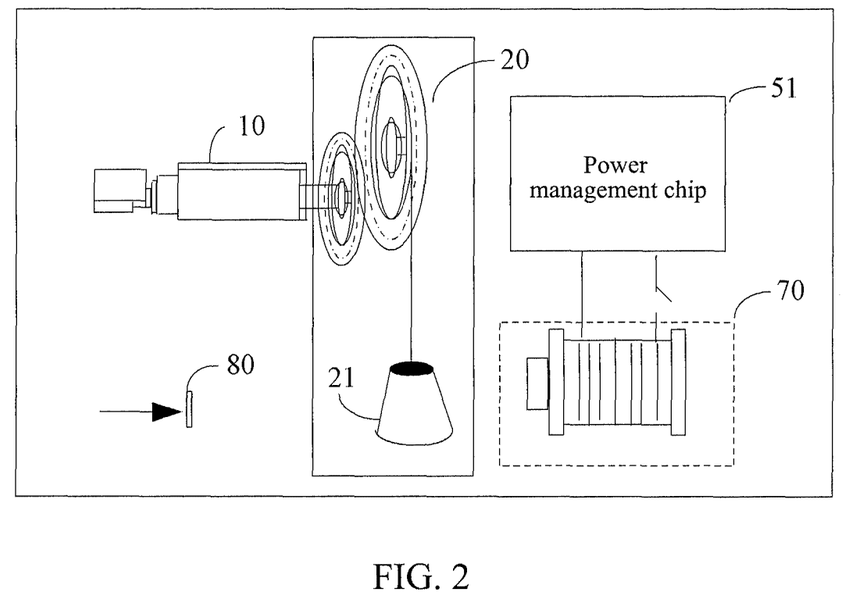
FIG. 2 is a circuit structure diagram of a drive module in a charging device for a mobile terminal of the present invention.

As shown in FIG. 2, the swing of the gravity hammer 21 can be implemented by swinging the mobile phone or pressing a button repeatedly to make the mobile phone vibrate. In an embodiment, by placing the mobile phone in a pocket of a user, the gravity hammer 21 can swing to produce the kinetic energy when the user is walking or is in a car, so that the motor 10 is made to be rotated to generate the electric energy. In another embodiment, the mobile phone is directly taken in one's hand, swinging an arm back and forth can drive the gravity hammer 21 built in the mobile phone to perform a periodic reciprocating swing. By the swing of the gravity hammer, the motor of the mobile phone is driven to be performed the movement of cutting the magnetic induction lines to generate pulse current. In another embodiment, when the body is in a state of rest, the user can also hold the mobile phone with the hand, and then presses a certain button repeatedly to make the mobile phone generate fluctuations and vibrations with a pressing frequency, thus the gravity hammer 21 can swing to produce the kinetic energy, so as to make the motor 10 be rotated to generate the electric energy. In another embodiment, the hammer of the gravity hammer 21 can also be set as a magnet, and a magnet whose magnetic pole is the same as that of the gravity hammer 21 is set right below the vibration button 80. According to the principle of the same poles of magnets repelling, when the mobile is in a fixed state or its back is placed in a plane, the magnet below the vibration button 80 can push the gravity hammer 21 to move to the distance if the vibration button 80 is pressed; and the gravity hammer 21 can also return back when the vibration button 80 returns back, therefore, the gravity hammer 21 can generate a swing to produce the kinetic energy by pressing the vibration button 80 repeatedly, so that the motor 10 is driven to be rotated.

The motion state of the gravity hammer 21 can be implemented with an electromagnetic relay module 70. In an embodiment, the electromagnetic relay module 70 has a coil and an armature, the magnetic field is generated around the coil when the coil is introduced with current. The armature is located at the magnetic pole of the magnetic field, material is soft iron, and the armature can be taken as a moving contact to control the swing of the gravity hammer 21, so as to control the charging device for the mobile terminal of the present invention to stop working when the battery 101 of the mobile phone has electricity or an external charging device is charging the mobile phone. For example, the power management chip 51 and the coil are conducted when the battery 101 has electricity or is being charged, and then a magnetic field is generated around the coil, thus the gravity hammer 21 is attracted on the armature and cannot swing, therefore the battery cannot be charged. While the coil loop cuts off when the battery 101 has no electricity, and the gravity hammer 21 can swing freely.

Taking in consideration that the outputting voltage of the generator is relatively small at a low rotation speed, the required current and power can be obtained by increasing the effective length of cutting a magnetic conductor or increasing the number of pole pairs.

The charge pump module 30 can adopt a switching regulator booster pump circuit. The charge pump module has capacitors and MOS switch tubes, the energy is stored through the capacitors, and the charging and discharging of the capacitors are controlled through the MOS switch tubes, so that the input voltage increases to a certain multiple (such as 4 times, 8 times, 10 times), to obtain the required charging output voltage.

In the present invention, the charge pump module 30 can be mainly composed of cascaded MOS switch tubes and capacitors, and the voltage conversion is implemented by the charging and discharging of the capacitors controlled by the MOS switch tubes, which has characteristics of a small volume, low power, high conversion efficiency and simple result, and so on, and can be placed in the inner space of the mobile phone; the cascading series of the switches can be increased as required to adjust the corresponding boost series so as to adapt to the mobile phone.

The charge pump module 30 can be controlled by the control unit 50, thus, it has a switch enabled control end, and shuts down the output of the circuit in a state of long standby or in a state of not requiring charging, so as to make the supplying current consumption be almost zero. For example, in an embodiment, the control unit 50 can send out a control signal to the MOS switch tubes, so as to control the MOS switch tubes to be disconnected in standby and without charging.

The filtering and voltage regulation module 40 can be a filtering and voltage regulation circuit, which comprises a filter circuit, a voltage regulation circuit and an overvoltage protection circuit. In an embodiment, a power filter is in the filter circuit, and can remove the alternating current component in a one-way pulsating direct current voltage provided by the charge pump module 30, so as to let the direct current component pass through. Taking the passive and low-power into account, a RC filter circuit can be adopted to implement a voltage filtering in earlier stage. The voltage regulation circuit provides the charging side of the phone with a stable voltage of 5V, and is composed of a voltage regulation tube and a resistance in parallel in the present invention. The input end is a voltage after filtering by the aforementioned charge pump module 30, and the output end is connected with an overvoltage protection device in the mobile phone. The overvoltage protection circuit directly multiplexes the overvoltage protection chip in the mobile phone to prevent the mobile phone from being burnt due to the too high instantaneous voltage. The output end of the overvoltage protection device is controlled by a control signal of the control unit 50, and is selected to be conducted through a triode so as to supply power to the battery.

The control unit 50 is connected with the filtering and voltage regulation module 40, and is used to accumulate charging current and to control the charging process. In an embodiment, the control unit 50 comprises a power management chip 51 and a charging control module 52; wherein, the power management chip 51 is connected with the output end of the filtering and voltage regulation module 40, and is used to accumulate the charging current so as to adapt to the battery 101 and to detect the charging state so as to control the charging process. Since the power of the battery 101 is too small to supply power to the battery 101 of the mobile phone at the beginning of charging, the charging current can be configured to be directly connected with the battery 101 through the output pin of the power management chip 51 in the present invention, and the current of the battery 101 is accumulated through the power management chip 51 so as to output valid current.

In a specific example, the power management chip 51 can detect whether there is an external charging device to charge the mobile phone, for example, the power management chip 51 can detect whether there is a universal serial bus (USB), an external power supply or the charging device for the mobile terminal of the present invention, and so on, to be charging the battery 101 of the mobile phone, and sends a control instruction according to a detecting result, so as to make the charging control module 52 disconnect or conduct the charging circuit between the filtering and voltage regulation module 40 and the rechargeable battery 101; the power management chip 51 can also perform a real-time detection on the power of the battery 101 of the mobile phone, so that an enable signal is opened to control the MOS switch tubes in the charge pump module 30 to conduce when the power of the battery 101 of the mobile phone is not enough or below a certain threshold, therefore a voltage matching the battery 101 of the mobile phone is provided. When the mobile phone has the external power supply to charge or manual power supply is saturated to reach a certain threshold, the power management chip 51 can also switch off the enable signal so as to disconnect the MOS switch tubes in the charge pump module 30 to reduce the leakage of the battery 101.

The charging control module 52 can be a charging control switch, which is located between the above filtering and voltage regulation module 40 and the battery 101 of the mobile phone. Specifically, the charging control switch can be a triode, which is set between the overvoltage protection chip and the battery 101 of the mobile phone, and is opened or closed according to the control of the power management chip 51 so as to disconnect or conduct the charging circuit. For example, the power management chip 51 can detect the charging mode, and sends a control signal to disconnect the charging control module 52 so as to disconnect the manual charging circuit of the present invention when finding that there is an external charger to charge the mobile phone. In another embodiment, when detecting that there is a USB power supply to charge the mobile phone, the power management chip 51 also sends the control signal to disconnect the charging control module 52 so as to disconnect the manual charging circuit of the present invention; even if the mobile phone is in a swing state, the charging device for the mobile terminal of the present invention cannot charge the mobile phone. In another embodiment, when detecting that the power of the battery is not enough and there is no external charging device to be charging, the power management chip 51 sends a control signal to control the charging control module 52 to close, so as to utilize the charging device for the mobile terminal of the present invention to charge the mobile phone. In a specific example, the power management chip 51 is further configured with a limited-time control circuit and a charging enable circuit, wherein the limited-time control circuit is used to control the charging time, so as to stop charging when the power of the battery 101 reaches a certain value; for example, a 500 mah battery will reach 4.2V after being charged with 250 ma for about two hours. The charging enable circuit is used to send the enable signal to open or close the charging control switch according to the detecting result on the charging mode. In addition, the charging control module 52 is further configured to stop charging the battery 101 when the average pulse current reaches 1% of the fast charging current.

In the present invention, the charging mode can also be selected to be switched through the control unit 50. In an embodiment, when the power of the mobile phone is not enough, the charging mode can be switched according to the detection by the power management chip 51 to the charging mode. For example, a button for switching the manual charging and the external charging is set on the mobile phone interface, and the charging mode is selected through the switching button; for example, switching of the button is utilized to select the charging mode of external charging when there is an external power supply in the external environment, and the mobile phone is charged through the external charger; switching of the button is utilized to select the charging mode of manual charging when there is no external power supply in the external environment, and the mobile phone is charged by the aforementioned charging device for the mobile terminal.

In the charging process, the charging state can be displayed by a charging display module 60. In an embodiment, the charging display module 60 has a light emitting diode such as a diode with red-green bicolor, and it can display whether the power of the battery reaches a certain threshold already by light being on/off, or by red light/green light.

Figure 3:
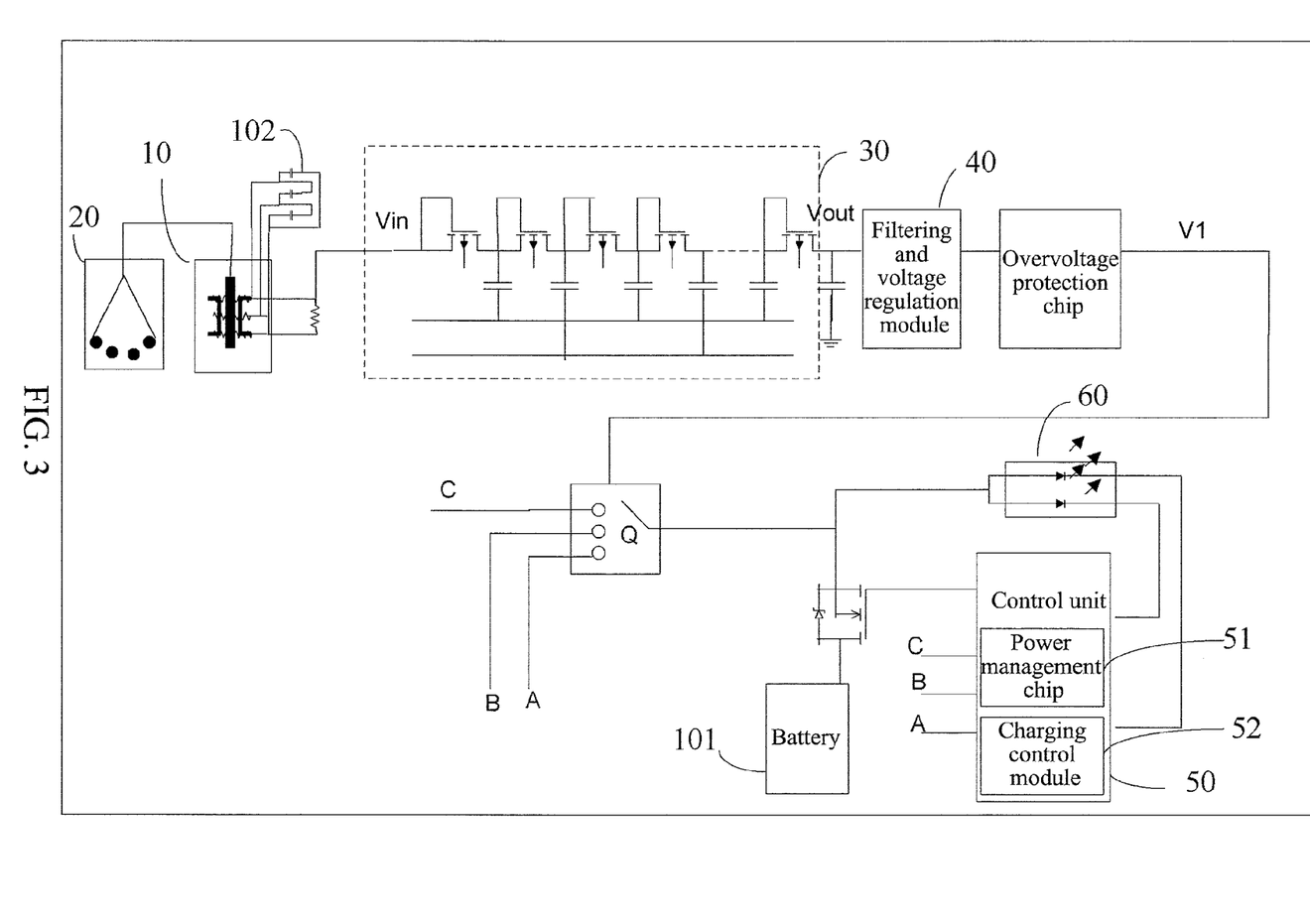
FIG. 3 is a circuit structure diagram of a charging device for a mobile terminal of the present invention.

FIG. 3 shows a circuit structure of a charging device for the mobile terminal of the aforementioned embodiment. As shown in FIG. 3, the drive module 20 is connected with the motor 10, the output end of the motor 10 is equipped with capacitors in parallel; the input end of the charge pump module 30 connects with the output end of the motor 10, the charge pump module 30 has cascaded MOS switch tubes and capacitors, and the output end of the charge pump module 30 is connected with the input end of the filtering and voltage regulation module 40; the output end of the filtering and voltage regulation module 40 is connected with the overvoltage protection chip of the mobile phone. The electric energy generated by the motor 10 forms a chargeable voltage V1 to output to the triode Q after boosting, filtering, voltage regulation and protection processing, and the triode Q is controlled by the charging control module 52, to be conducted or disconnected according to the control signal of the charging control module 52. In an embodiment, a USB detection circuit A, a charger detection circuit B and a detection circuit C of the charging device for the mobile terminal of the present invention are configured in the power management chip 51.

The charging control module 52 comprises the triode Q; and the power management chip 51 sends the enable signal to conduct the triode Q according to the detection result of no USB or charger to charge the mobile phone, so as to output the electric energy to the output end inside the mobile phone when utilizing the charging device for the mobile terminal of the present invention to charge. The power management chip 51 shuts down the enable signal when there is an external power to charge the mobile phone or manual power supply is saturated to reach a certain threshold, so as to disconnect the charging circuit of the charging device for the mobile terminal to reduce the leakage of the battery.

The present invention also provides a mobile terminal, which comprises the above battery 101 and the aforementioned charging device for the mobile terminal. The structure of the charging device for the mobile terminal can refer to the above embodiments, and is not repeated herein.

The mobile terminal of the present invention can take full use of kinetic energy of a human body to charge, and the charging process is simple and convenient.

The aforementioned description is only the preferable embodiments of the present invention, and is not intended to restrict the patent scope of the present invention; all equivalent structures or equivalent process variations, which are made by utilizing the specification and the accompany drawing content of the present invention, or are applied directly or indirectly to the other relevant technical fields, should be included in the protection scope of the present invention similarly.

Those skilled in the art can understand that all of or part of steps of the aforementioned method can be completed by programs instructing the relevant hardware, and the programs might be stored in a computer readable storage medium, such as a read-only memory, a magnetic disk, or an optical disk, and so on. Alternatively, all of or part of steps of the aforementioned embodiments can be implemented with one or more integrated circuits. Correspondingly, each module/unit in the above embodiments can be implemented in the form of hardware, or also can be implemented in the form of software functional modules. The present invention is not limited to any specific form of a combination of hardware and software.

INDUSTRIAL APPLICABILITY

The charging device for the mobile terminal provided by the present invention, is set in the mobile terminal, and takes full advantage of the body kinetic energy to drive the motor to work through the aforementioned drive module, so that a battery in the mobile terminal can be charged by outputting the electric energy; thus the influence of external factors of human, environments and so on is reduced during the charging process, and the convenience for charging the mobile terminal is improved greatly.

What is claimed is:

1. A charging device for a mobile terminal, comprising a motor for power generation, a drive module, a charge pump module, a filtering and voltage regulation module and a control unit; wherein, the drive module is connected with an input end of the motor and is configured to obtain swing kinetic energy of the mobile terminal to drive the motor to work;

the charge pump module is connected with an output end of the motor and is configured to boost a voltage output by the motor;

the filtering and voltage regulation module, an input end of which is connected with the charge pump module, is configured to perform direct current filtering and voltage regulation processing on a voltage output by the charge pump module, so as to output a charging voltage matching with a rechargeable battery;

the control unit is connected with the filtering and voltage regulation module and is configured to accumulate charging current so as to adapt to the rechargeable battery and to control a charging process;

wherein, the drive module comprises a gear set and a gravity hammer, and the gravity hammer is connected with the motor through the gear set, so as to adjust rotation speed of the motor to make the motor output electric energy;

when the gravity hammer is a magnet, the drive module further comprises a vibration button, which is a common key of the mobile terminal and is directly above the gravity hammer; and a second magnet whose magnetic pole is the same as that of the gravity hammer is set right below the vibration button; so that, once the vibration button is pressed, the gravity hammer swings freely to drive the gear to rotate.

2. The charging device for the mobile terminal as claimed in claim 1, wherein, the motor is a vibration motor in the mobile terminal, and the charging device for the mobile terminal further comprises a motor conversion circuit, which has at least two parallel capacitors and is configured to convert the vibration motor from an electric mode to a power generation mode.

3. The charging device for the mobile terminal as claimed in claim 1, wherein, the charge pump module is a switching regulator booster pump circuit, in which at least two sets of switches and capacitors are configured in parallel.

4. The charging device for the mobile terminal as claimed in claim 3, wherein, the filtering and voltage regulation module comprises a filtering module, a voltage regulation module and an overvoltage protection module; the filtering module is configured to obtain a direct current voltage, the voltage regulation module is configured to perform the voltage regulation processing to the direct current voltage obtained by the filtering module, so as to obtain a stable charging voltage, and the overvoltage protection module is multiplexed with an overvoltage protection chip of the mobile terminal.

5. The charging device for the mobile terminal as claimed in claim 4, wherein, the control unit comprises a power management chip and a charging control module; the power management chip is connected with an output end of the filtering and voltage regulation module and is configured to accumulate a charging current to adapt to the rechargeable battery, and to detect a charging state or power of the rechargeable battery so as to control the charging process; and the charging control module is configured to disconnect or conduct a charging circuit between the filtering and voltage regulation module and the rechargeable battery according to the control of the power management chip.

6. The charging device for the mobile terminal as claimed in claim 5, further comprising a charging switching module and a charging display module connected with the power management chip; wherein, the charging display module is configured to display the charging state, and the charging switching module is configured to implement a switch between a manual charging and an external charging according to the charging state.

7. The charging device for the mobile terminal as claimed in claim 1, further comprising an electromagnetic relay module which comprises a coil and an armature; wherein, the coil is connected with the power management chip, and the armature is configured to control the swing of the gravity hammer, and when the power management chip energizes the coil, to attract the gravity hammer, and when the power management chip does not energize the coil, to separate from the gravity hammer.

8. A mobile terminal, comprising a rechargeable battery and a charging device for a mobile terminal, wherein the charging device for the mobile terminal comprises a motor for power generation, a drive module, a charge pump module, a filtering and voltage regulation module and a control unit; wherein, the drive module is connected with an input end of the motor and is configured to obtain swing kinetic energy of the mobile terminal to drive the motor to work;

the charge pump module is connected with an output end of the motor and is configured to boost a voltage output by the motor;

the filtering and voltage regulation module, an input end of which is connected with the charge pump module, is configured to perform direct current filtering and voltage regulation processing on a voltage output by the charge pump module, so as to output a charging voltage matching with the rechargeable battery;

the control unit is connected with the filtering and voltage regulation module and is configured to accumulate charging current so as to adapt to the rechargeable battery and to control a charging process;

wherein, the drive module comprises a gear set and a gravity hammer, and the gravity hammer is connected with the motor through the gear set, so as to adjust rotation speed of the motor to make the motor output electric energy;

when the gravity hammer is a magnet, the drive module further comprises a vibration button, which is a common key of the mobile terminal and is directly above the gravity hammer; and a second magnet whose magnetic pole is the same as that of the gravity hammer is set right below the vibration button; so that, once the vibration button is pressed, the gravity hammer swings freely to drive the gear to rotate.

9. The mobile terminal as claimed in claim 8, wherein, the motor is a vibration motor in the mobile terminal, and the charging device for the mobile terminal further comprises a motor conversion circuit, which has at least two parallel capacitors and is configured to convert the vibration motor from an electric mode to a power generation mode.

10. The mobile terminal as claimed in claim 8, wherein, the drive module comprises a gear set and a gravity hammer, and the gravity hammer is connected with the motor through the gear set, so as to adjust rotation speed of the motor to make the motor output electric energy.

11. The mobile terminal as claimed in claim 9, wherein, the drive module comprises a gear set and a gravity hammer, and the gravity hammer is connected with the motor through the gear set, so as to adjust rotation speed of the motor to make the motor output electric energy.

12. The charging device for the mobile terminal as claimed in claim 8, wherein, the charge pump module is a switching regulator booster pump circuit, in which at least two sets of switches and capacitors are configured in parallel.

13. The charging device for the mobile terminal as claimed in claim 12, wherein, the filtering and voltage regulation module comprises a filtering module, a voltage regulation module and an overvoltage protection module; the filtering module is configured to obtain a direct current voltage, the voltage regulation module is configured to perform the voltage regulation processing to the direct current voltage obtained by the filtering module, so as to obtain a stable charging voltage, and the overvoltage protection module is multiplexed with an overvoltage protection chip of the mobile terminal.

14. The charging device for the mobile terminal as claimed in claim 13, wherein, the control unit comprises a power management chip and a charging control module; the power management chip is connected with an output end of the filtering and voltage regulation module and is configured to accumulate a charging current to adapt to the rechargeable battery, and to detect a charging state or power of the rechargeable battery so as to control the charging process; and the charging control module is configured to disconnect or conduct a charging circuit between the filtering and voltage regulation module and the rechargeable battery according to the control of the power management chip.

15. The charging device for the mobile terminal as claimed in claim 14, further comprising a charging switching module and a charging display module connected with the power management chip; wherein, the charging display module is configured to display the charging state, and the charging switching module is configured to implement a switch between a manual charging and an external charging according to the charging state.

16. The charging device for the mobile terminal as claimed in claim 8, further comprising an electromagnetic relay module which comprises a coil and an armature; wherein, the coil is connected with the power management chip, and the armature is configured to control the swing of the gravity hammer, and when the power management chip energizes the coil, to attract the gravity hammer, and when the power management chip does not energize the coil, to separate from the gravity hammer.

\* \* \* \* \*